United States Patent
Pillai et al.

(10) Patent No.: US 10,417,815 B2
(45) Date of Patent: Sep. 17, 2019

(54) OUT OF ORDER PIXEL SHADER EXPORTS

(71) Applicant: Advanced Micro Devices, Inc., Sunnyvale, CA (US)

(72) Inventors: Pazhani Pillai, Boxborough, MA (US); Christopher J. Brennan, Boxborough, MA (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 0 days.

(21) Appl. No.: 15/418,557

(22) Filed: Jan. 27, 2017

(65) Prior Publication Data

US 2018/0218532 A1    Aug. 2, 2018

(51) Int. Cl.
| | |
|---|---|
| *G06T 15/80* | (2011.01) |
| *G06T 7/50* | (2017.01) |
| *G06T 7/70* | (2017.01) |
| *G06T 1/20* | (2006.01) |
| *G06T 1/60* | (2006.01) |
| *G06T 15/40* | (2011.01) |
| *G06T 15/00* | (2011.01) |

(52) U.S. Cl.
CPC ............... *G06T 15/80* (2013.01); *G06T 1/20* (2013.01); *G06T 1/60* (2013.01); *G06T 7/50* (2017.01); *G06T 7/70* (2017.01); *G06T 15/005* (2013.01); *G06T 15/40* (2013.01); *G06T 15/405* (2013.01); *G06T 2200/04* (2013.01); *G06T 2200/28* (2013.01)

(58) Field of Classification Search
CPC ......... G06T 15/005; G06T 15/80; G06T 1/20; G06T 1/60
See application file for complete search history.

(56) References Cited

U.S. PATENT DOCUMENTS 5,760,793 A * 6/1998 Ellert ..................... G09G 5/393
345/536
8,760,460 B1  6/2014 Kilgariff et al.
(Continued)

OTHER PUBLICATIONS

Magnus Andersson et al., "Masked Depth Culling for Graphics Hardware", ACM Transactions on Graphics (TOG), ACM, US, vol. 34, No. 6, Oct. 26, 2015, 9 pages.
(Continued)

*Primary Examiner* — Jitesh Patel
(74) *Attorney, Agent, or Firm* — Volpe and Koenig, P.C.

(57) ABSTRACT

Improvements in graphics processing pipelines are disclosed. The graphics processing pipeline processes graphics objects in a particular order (application programming interface order—"API order") as requested by an application or other entity. However, certain components within the graphics processing pipeline, such as the pixel shader stage, may process those objects out of order. A technique is provided herein to allow the pixel shader stage to complete and export processed fragments out of order. The technique includes using a scoreboard to determine whether fragments ready to be exported from a pixel shader stage are the newest fragments in API order. If the fragments are the newest in API order, then the fragments are exported. If the fragments are not the newest in API order, then the fragments are discarded.

20 Claims, 6 Drawing Sheets

(56) References Cited

U.S. PATENT DOCUMENTS

| | | | | |
|---|---|---|---|---|
| 2004/0066385 A1* | 4/2004 | Kilgard | G06T 15/04 | 345/506 |
| 2006/0055695 A1* | 3/2006 | Abdalla | G06T 11/40 | 345/426 |
| 2007/0146380 A1* | 6/2007 | Nystad | H04N 19/43 | 345/582 |
| 2009/0073168 A1* | 3/2009 | Jiao | G06T 15/005 | 345/426 |
| 2009/0198972 A1 | 8/2009 | Nystad et al. | | |
| 2011/0080407 A1* | 4/2011 | Duluk, Jr. | G06T 15/005 | 345/426 |
| 2012/0069021 A1* | 3/2012 | Son | G06T 15/40 | 345/426 |
| 2012/0223947 A1* | 9/2012 | Nystad | G06T 15/005 | 345/426 |
| 2013/0155080 A1* | 6/2013 | Nordlund | G06T 15/005 | 345/522 |
| 2014/0168220 A1* | 6/2014 | Nystad | G06T 15/40 | 345/421 |
| 2014/0292756 A1* | 10/2014 | Mantor | G06T 15/005 | 345/426 |
| 2014/0354654 A1* | 12/2014 | Heggelund | G06T 1/20 | 345/501 |
| 2015/0002524 A1* | 1/2015 | Nystad | G06F 17/17 | 345/545 |
| 2015/0062154 A1* | 3/2015 | Ellis | G06T 15/005 | 345/619 |
| 2016/0035129 A1* | 2/2016 | Bolz | G06T 15/005 | 345/420 |
| 2016/0086299 A1* | 3/2016 | Sharma | G06T 1/20 | 345/422 |
| 2016/0307365 A1* | 10/2016 | Liao | G06T 1/20 | |
| 2018/0114290 A1* | 4/2018 | Paltashev | G06T 15/005 | |

OTHER PUBLICATIONS

Marilena Maule et al., "A Survey of Raster-Based Transparency Techniques", Computers and Graphics, Elsevier, GB, vol. 35, No. 6, Jul. 25, 2011, pp. 1023-1034.

* cited by examiner

| Fragment | Scoreboard 326 | To Output Merger |
|---|---|---|
| (32,16) order 160 502(1) | {(15,30) invalid, (14,1) invalid, (32,16) invalid} 504(1) | (32,16) order 160 506(1) |
| (15,30) order 102 502(2) | {(15,30) invalid, (14,1) invalid, (32,16) order 160} 504(2) | (15,30) order 102 506(2) |
| (15,30) order 100 502(3) | {(15,30) order 102, (14,1) invalid, (32,16) order 160} 504(3) | culled |
| (14,1) order 75 502(4) | {(15,30) order 102, (14,1) invalid, (32,16) order 160} 504(4) | (14,1) order 75 506(3) |
| (32,16) order 140 502(5) | {(15,30) order 102, (14,1) order 75, (32,16) order 160} 504(5) | culled |
| (32,16) order 122 502(6) | {(15,30) order 102, (14,1) order 75, (32,16) order 160} 504(6) | culled |

FIG. 5

OUT OF ORDER PIXEL SHADER EXPORTS

TECHNICAL FIELD

The disclosed embodiments are generally directed to graphics processing pipelines, and in particular, to out of order pixel shader exports.

BACKGROUND

Three-dimensional graphics processing pipelines accept commands from a host (such as a central processing unit of a computing system) and process those commands to generate pixels for display on a display device. Graphics processing pipelines include a number of stages that perform individual tasks, such as transforming vertex positions and attributes, calculating pixel colors, and the like. Graphics processing pipelines are constantly being developed and improved.

BRIEF DESCRIPTION OF THE DRAWINGS

A more detailed understanding may be had from the following description, given by way of example in conjunction with the accompanying drawings wherein:

FIG. 5 illustrates details of the out of order export block and the scoreboard, as well as example operations for performing out of order exports from the pixel shader stage.

DETAILED DESCRIPTION

The present disclosure is directed to improvements in the graphics processing pipeline. The graphics processing pipeline processes graphics objects in a particular order (application programming interface order—"API order") as requested by an application or other entity. However, certain components within the graphics processing pipeline, such as the pixel shader stage, may process those objects out of order. A technique is provided herein to allow the pixel shader stage to complete and export processed fragments out of order. The technique includes using a scoreboard to determine whether fragments ready to be exported from a pixel shader stage are the newest fragments in API order. If the fragments are the newest in API order, then the fragments are exported. If the fragments are not the newest in API order, then the fragments are discarded.

Figure 1:
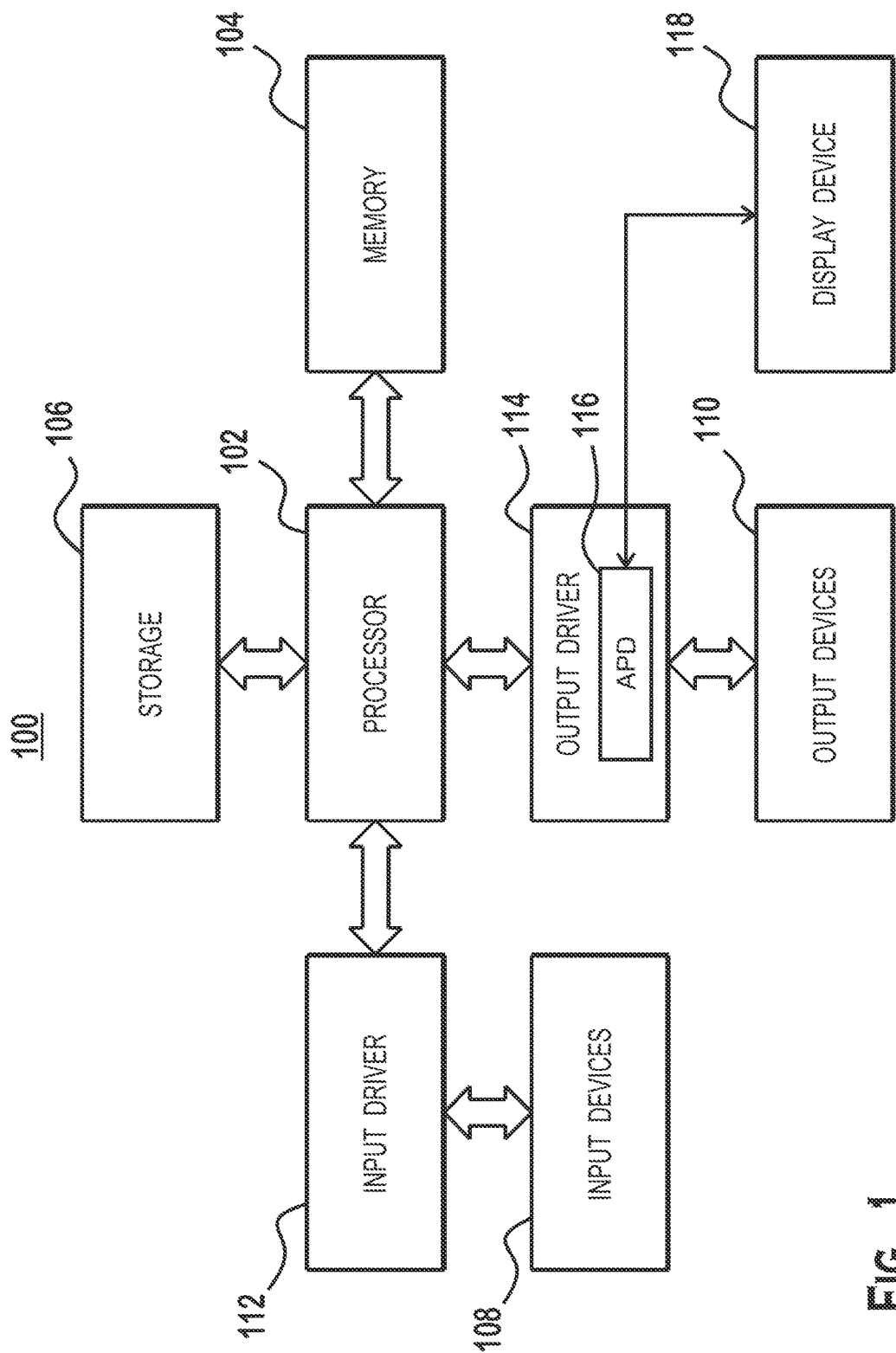
FIG. 1 is a block diagram of an example device in which one or more disclosed embodiments may be implemented.

FIG. 1 is a block diagram of an example device 100 in which one or more aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device (APD) 116 which is coupled to a display device 118. The APD is configured to accept compute commands and graphics rendering commands from processor 102, to process those compute and graphics rendering commands, and to provide pixel output to display device 118 for display.

The APD 116 includes one or more parallel processing units configured to perform computations in accordance with a single-instruction-multiple-data ("SIMD") paradigm. However, functionality described as being performed by the APD 116 may also be performed by processing devices that do not process data in accordance with a SIMD paradigm.

Figure 2:
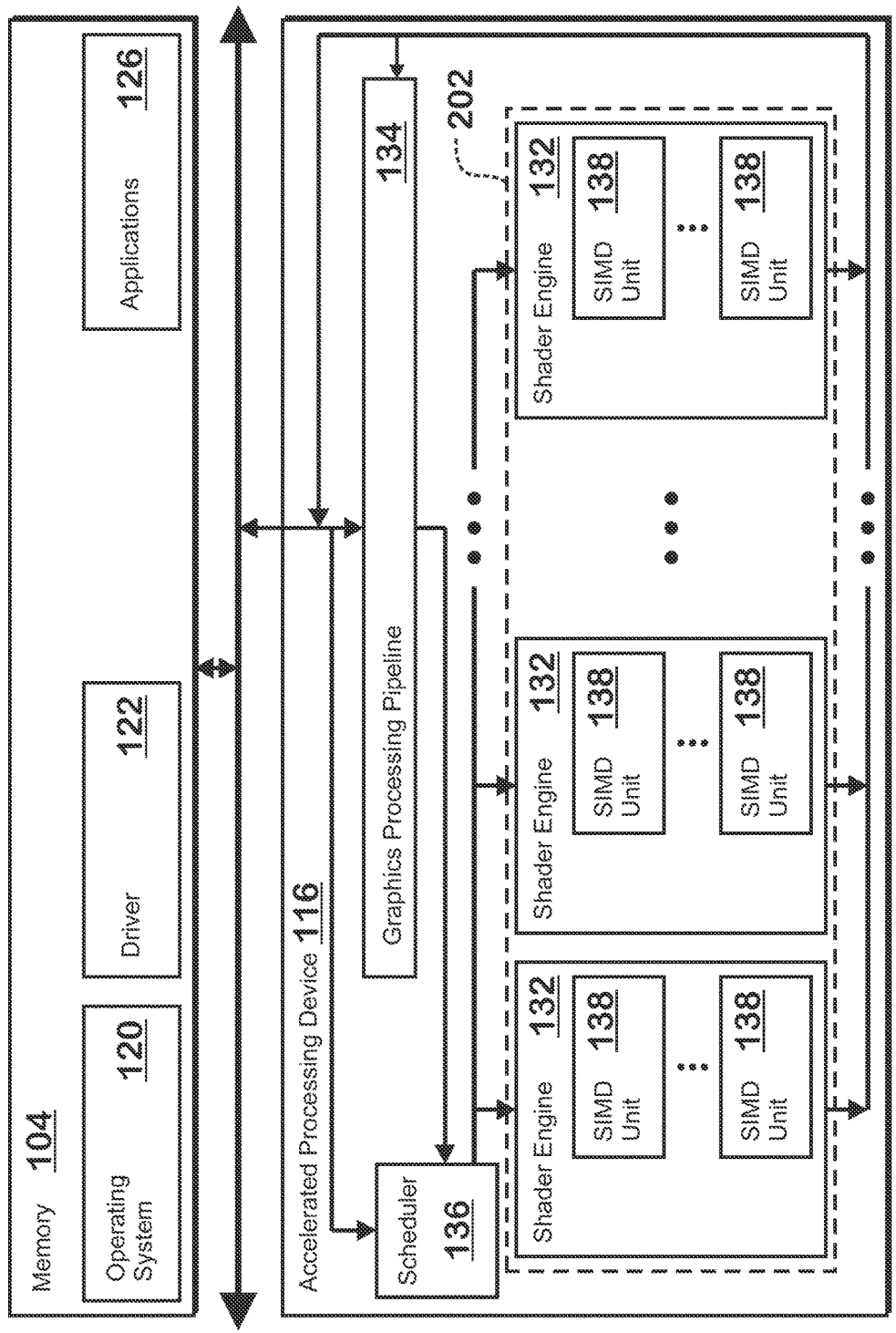
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline.

The APD 116 includes shader engines 132 (which may collectively be referred to herein as "programmable processing units 202") that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in shader engines 132 is a work-item. Each work-item represents a single instantiation of a shader program that is to be executed in parallel in a particular lane. Work-items are typically executed simultaneously as a "wavefront" on a single SIMD unit 138. Multiple wavefronts are be included in a "work group," which includes a collection of work-items designated to execute the same program. A work group is executed by executing each of the wavefronts that make up the work group. The wavefronts may executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A scheduler 136 is configured to perform operations related to scheduling various wavefronts on different shader engines 132 and SIMD units 138, as well as performing other operations for orchestrating various tasks on the APD 116.

The parallelism afforded by the shader engines 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the shader engines 132 for execution in parallel.

The shader engines 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution.

Figure 3:
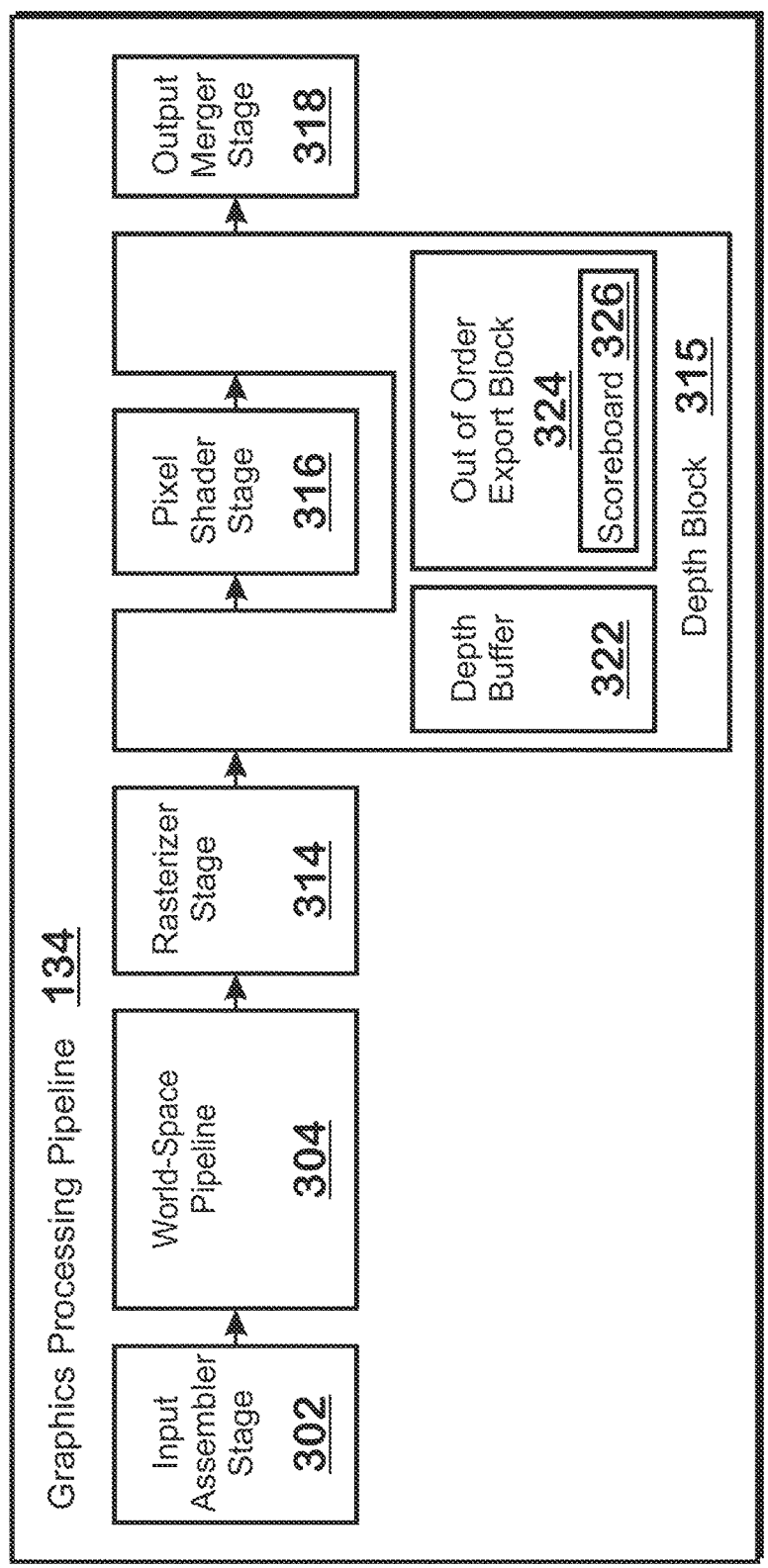
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes an input assembler stage 302, a world-space pipeline 304, a rasterizer stage 314, a depth block 315, a pixel shader stage, and an output merger stage 318.

The input assembler stage 302 reads primitive data from user-filled buffers (e.g., buffers filled at the request of software executed by the processor 102, such as an application 126) and assembles the data into primitives for use by the remainder of the pipeline. As used herein, the term "user" refers to the application 126 or other entity that provides shader code and three-dimensional objects for rendering to the graphics processing pipeline 134. The term "user" is used to distinguish over activities performed by the APD 116. The input assembler stage 302 can generate different types of primitives based on the primitive data included in the user-filled buffers. The input assembler stage 302 formats the assembled primitives for use by the rest of the pipeline.

The world-space pipeline 304 performs vertex and primitive manipulation, converting objects defined in three-dimensional world-space to triangles defined in screen space. The world-space pipeline 304 reads primitive data from user-filled buffers (e.g., buffers filled at the request of software executed by the processor 102, such as an application 126) and assembles the data into primitives for use by the remainder of the pipeline. The world-space pipeline 304 performs functionality for converting the input received from a processor 102 into a form more amenable to rendering into screen pixels. More specifically, the world-space pipeline 304 performs vertex shading functions, optional tessellation functions if tessellation is enabled, and optional geometry shading functions if geometry shading is enabled.

Vertex shading includes performing various per-vertex operations such as transformations, skinning, morphing, and per-vertex lighting. Transformation operations may include various operations to transform the coordinates of the vertices. These operations may include one or more of modeling transformations, viewing transformations, projection transformations, perspective division, and viewport transformations. Herein, such transformations are considered to modify the coordinates or "position" of the vertices on which the transforms are performed. Other operations of vertex shading may modify attributes other than the coordinates. Vertex shading is implemented partially or fully as vertex shader programs to be executed on one or more shader engines 132. In some examples, the vertex shader programs are provided by the processor 102 and are based on programs that are pre-written by a computer programmer. The driver 122 compiles such programs to generate the vertex shader programs having a format suitable for execution within the shader engines 132. In other examples, the vertex shader programs are provided by the driver 122 directly, are retrieved from a memory of the APD 116 itself, or are provided through any other technically feasible means.

Tessellation converts simple primitives into more complex primitives by subdividing the primitives. Tessellation involves generating a patch for the tessellation based on an input primitive, generating a set of samples for the patch, and calculating vertex positions for the vertices corresponding to the samples for the patch. Tessellation can be performed partially or fully by shader programs executed on the programmable processing units 202.

Geometry shading performs vertex operations on a primitive-by-primitive basis. A variety of different types of operations can be performed via geometry shading, including operations such as point sprite expansion, dynamic particle system operations, fur-fin generation, shadow volume generation, single pass render-to-cubemap, per-primitive material swapping, and per-primitive material setup. Operations for geometry shading may be performed by a shader program that executes on the programmable processing units 202.

The world-space pipeline 304 can be implemented as a combination of hardware (including fixed function and programmable hardware) and software, as all hardware (including all fixed function hardware, all programmable hardware, or a combination thereof), or entirely as software executing on a hardware processor. The world-space pipeline 304 outputs primitives (typically triangles) for processing by other units in the graphics processing pipeline 134 for eventual conversion to screen-pixels to be written to a frame buffer and output to a display device 118 or to be output to a surface other than a frame buffer, such as a depth buffer, stencil buffer, or other buffer.

The rasterizer stage 314 accepts and rasterizes simple primitives (also referred to as "triangles" at the end of the world-space pipeline 330) generated upstream of the rasterizer stage 314. Rasterization consists of determining which screen pixels (or sub-pixel samples) are covered by a particular primitive and outputting fragments for each covered pixel or sub-pixel sample. A fragment is a candidate pixel that may or may not affect the final image output at the end of the graphics processing pipeline 134. Fragments are generated by the rasterizer stage 314 based on the results of rasterization of a triangle and are processed through the remainder of the pipeline. More specifically, fragments begin at the rasterizer stage 314, where fragments corresponding to each pixel or sub-pixel sample that is covered by a particular triangle being rasterized are output. Rasterization is performed by fixed function hardware or may be performed by shader programs executing in the programmable processing units 202.

The depth block 315 performs z-culling to remove fragments that are occluded by other fragments already processed by the depth block 315. Z-culling is performed based on the depth value of the fragments. To perform z-culling, the depth block 315 stores a depth buffer 322. The depth buffer 322 stores depth values for fragments processed by the depth block 315. The depth block 315 compares fragments from the rasterizer stage 314 to values stored in the depth buffer 322 to determine whether the fragment passes the depth test. If a fragment passes the depth test, the fragment is not culled and proceeds to the rest of the graphics processing pipeline 134. If a fragment does not pass the depth test, the fragment is culled.

The depth block 315 also includes an out of order export block 324 that includes a scoreboard 324. The out of order export block 324 facilitates out of order exports from the pixel shader stage 316. An export occurs when the pixel shader stage 316 completes processing for a fragment in the parallel processing units 202 (e.g., determines a color for the fragment) and sends the pixel out of the parallel processing units 202 for further processing by the remainder of the graphics processing pipeline 134. Objects are processed through the graphics processing pipeline 134 in "application programming interface order" ("API order"), which is the order in which the CPU 102 (or other unit that requests rendering of graphics) requests objects to be processed by the graphics processing pipeline 134. This ordering imposes limits on the manner in which the pixel shader stage 316 operates. Specifically, the pixel shader stage 316 may actually complete processing fragments out of API order. For example, the pixel shader stage 316 may complete a newer fragment before an older fragment. In one approach, the pixel shader stage 316 would have to hold newer fragments until older fragments complete processing, then export the older fragments, and then the newer fragments, in order to maintain API order. This "holding" approach would require at least some memory to buffer the out of order values. Thus, in another approach, instead of using a buffer to maintain API order for pixel shader exports, the out of order export block 324 includes a scoreboard 326 to assist with allowing out-of-order exports from the pixel shader stage 316. Additional details regarding the out of order export block 324 are provided below.

The pixel shader stage 316 calculates output values (e.g., color values) for screen pixels based on the primitives generated upstream and the results of rasterization. The pixel shader stage 316 may apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel, which are written to a frame buffer for output to the display device 118.

Figure 4:
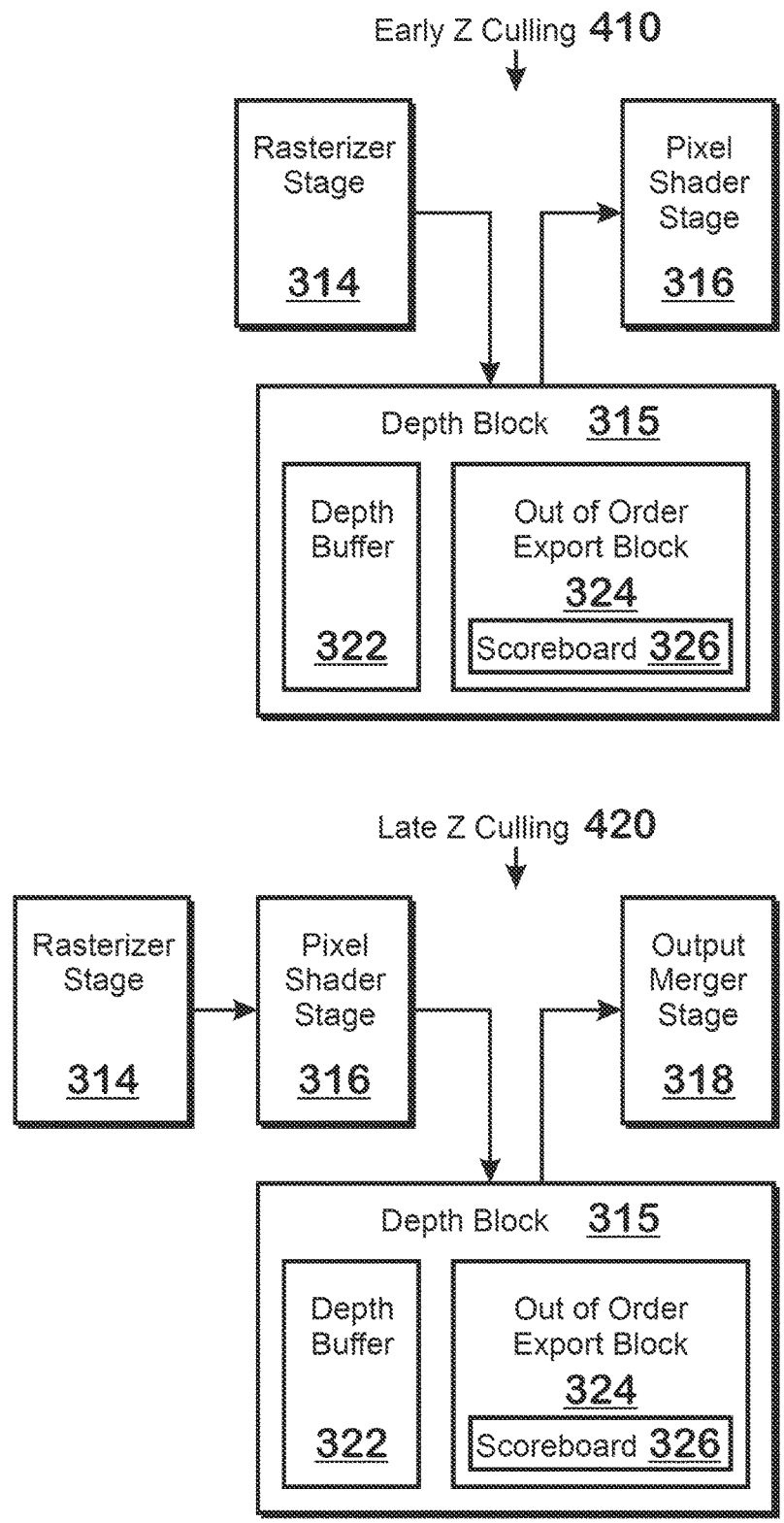
FIG. 4 illustrates early z and late z modes, according to an example.

Z-culling, performed by the depth block 315, is performed in one of two modes: early z-culling and late z-culling. FIG. 4 illustrates early z and late z modes, according to an example. In the early z culling configuration 410, the depth block 315 performs z-culling for fragments received from the rasterizer stage 314, before those fragments are processed by the pixel shader stage 316. In the late z culling configuration 420, the depth block 315 performs z-culling for fragments received from the pixel shader stage 316, after those fragments have been processed by the pixel shader stage.

In general, early z-culling is advantageous as compared with late z-culling because fragments that are culled before the pixel shader stage 316 are not processed by the pixel shader stage 316. Thus, with early z-culling, the amount of "unnecessary" work performed by the pixel shader stage 316 is lower than if late z-culling is performed, because late z-culling culls after the pixel shader stage 316.

Late z-culling is performed in certain situations such as when the pixel shader stage 316 determines or modifies the depth values for fragments. More specifically, if the pixel shader stage 316 is able to determine or modify the depth values for fragments, then z-culling cannot occur before the pixel shader stage 316. Instead, z-culling is performed after the pixel shader 316, in late z-culling mode.

Whether early z-culling or late z-culling is performed is a mode that is set for work (e.g., primitives and fragments) flowing through the graphics processing pipeline 134. The mode is set based on whether updates to or generation of depth values is enabled for that work in the pixel shader stage 316. If updates to or generation of depth values is enabled in the pixel shader stage 316, then late z-culling is used and if updates and generation of depth values is not enabled for that work in the pixel shader stage 316, then early z-culling is used.

Z-culling involves a z-test, the results of which determine whether the fragment "survives" the z-test and is passed through to later units in the graphics processing pipeline 134 or is "culled" and thus discarded. The z-test compares the depth value of an incoming fragment to a depth value stored in the depth buffer 322, for the screen position corresponding to that fragment, to determine whether the z-test passes or fails for that fragment. A specific z-function used determines the manner in which the z-test is performed. Z-culling also sometimes involves updating depth values stored in the depth buffer 322. Whether depth values are updated depends on several factors, including whether updates to the depth buffer 322 are enabled, which z-function is used, and whether a fragment passes or fails the z-test.

Several z-functions are possible. Possible z-functions include "never," "less," "greater," "less than or equal," "greater than or equal," "equal," "not equal," and "always." For each of these z-functions, it is possible for writes to the depth buffer 322 to be enabled or not enabled. Whether writes are enabled or not is a mode that can be applied to specific work (e.g., fragments or triangles). In general, the z-test passes for a particular function if an incoming fragment meets the condition with respect to a depth value stored in the depth buffer 322 (e.g., the depth value for the incoming fragment is placed before the z-function condition phrase and the depth value stored in the depth buffer 322 is placed after the z-function condition phrase; thus the z-test for z-function "less" evaluates the condition of whether the depth value for the incoming fragment is less than the depth value stored in the depth buffer 322 for the screen-position of that incoming fragment). The comparison for the z-test that is performed is between the fragment and the depth value in the depth buffer 322 that is for the screen-position that matches the screen-position of the fragment. Thus if a fragment has a screen position of x=120, y=85, then the comparison for the z-test that is performed is between that fragment and the depth value that corresponds to screen position x=120, y=85, which is stored in the depth buffer 322.

The "never" z-function never passes (and thus always discards) incoming fragments. The "always" z-function always passes (and thus never discards) incoming fragments. The "less," "greater," "less than or equal" or "greater than or equal" test passes for fragments if the mentioned condition (e.g., less, greater, etc.) is met and culls fragments if the mentioned condition is not met. For example, if the z-function is "less" and an incoming fragment has a depth value that is less than the corresponding depth value in the depth buffer 322, then the z-test passes for that fragment and the fragment is not culled. If the z-function is "less" and an incoming fragment has a depth value that is equal to or greater than the corresponding depth value in the depth buffer 322, then the z-test fails for that fragment and the fragment is culled. The "equal" and "not equal" z-functions are similar in that if the mentioned condition is met for a fragment, then the z-test passes for the fragment, which is not culled, and if the mentioned condition is not met for a fragment, then the z-test fails for that fragment, and the depth block 315 culls that fragment.

For each of the above fragments, it is possible for writes to the depth buffer 322 to be enabled or not enabled. If writes to the depth buffer 322 are enabled, then depth block 315 updates the depth buffer 322 in response to determining that a fragment passes the z-test and does not update the depth buffer 322 in response to determining that a fragment fails the z-test. The value with which the depth buffer is updated is the depth value of the incoming fragment. If writes to the depth buffer 322 are not enabled, then the depth buffer 322 is not updated regardless of whether a fragment passes the z-test. In an example, the z-function is "less" and writes to the depth buffer 322 are enabled. In this example, an incoming fragment has screen position x=80, y=50 and depth value 0.6. The depth value in the depth buffer 322 corresponding to screen position x=80, y=50 is 0.8. The depth value of the fragment is less than the depth value stored in the depth buffer 322, meaning that the fragment passes the z-test. Because the fragment passes the z-test, that fragment is passed out of the depth block 315 to a subsequent unit (e.g., the pixel shader stage 316 if early z is enabled or the output merger stage 318 if late z is enabled) and because writes are enabled and the fragment passes the z-test, the depth block 315 updates the depth buffer for screen position x=80, y=50 to the depth value of the fragment, which is equal to 0.6.

Whether late- or early-z culling is used affects whether the out of order export block 324 exports fragments out of order in the manner described herein (e.g., in FIG. 5) or exports fragments in a substantially different manner (such as exporting the fragments in API order). If early z-culling is applied, then the out of order export block 324 exports fragments out of order. If late z-culling is applied, then whether the out of order export block 324 exports fragments out of order depends on certain factors. For early z-culling, because z-culling is performed, later fragments in API order are known to be not occluded by earlier fragments. Thus, fragments that are not the newest fragment will definitely be overwritten by at least one newer fragment. For late z-culling, which occurs after the pixel shader stage 316 has processed a fragment, the technique described above is not necessarily applied (i.e., fragments are buffered and exported in order, or some other technique is used to export fragments from the pixel shader stage 316). More specifically, unlike with early z-culling, if late z-culling is applied and the out of order technique were used, then the depth test would be performed out of order, which could lead to incorrect results. For this reason, the out of order technique is applied in certain instances if late z-culling is enabled. These instances are reflected in Table 1, below.

TABLE 1

Instances where the discard technique is applied for late z-culling

| Z function | Are writes to the depth buffer enabled? | Out of order technique applied? |
|---|---|---|
| Never | Yes or No | N/A |
| Less or Greater | Yes | No, except that if the depth value of the incoming fragment equals the depth value stored in the depth buffer, then yes |
| Less or Greater | No | Yes |
| Less than or equal or Greater than or equal | Yes | Yes if the depth value of the incoming fragment equals the depth value stored in the depth buffer No if the depth value of the incoming fragment does not equal the depth value stored in the depth buffer |
| Less than or equal or Greater than or equal | No | Yes |
| Equal | Yes or No | Yes |
| Not Equal | Yes | No |
| Not Equal | No | Yes |
| Always | Yes | No |
| Always | No | Yes |

If writes to the depth buffer during z-culling are not enabled, then the out of order technique is applied. If writes to the depth buffer are enabled, then the out of order technique is not used if the z function is "less than" or "greater than," "not equal," or "always." If writes to the depth buffer are enabled and the z function is "less than or equal" or "greater than or equal," and the specific depth test result is that the depth value of the incoming fragment equals the depth value in the depth buffer, then the out of order technique is applied. If writes to the depth buffer are enabled and the z function is "less than or equal" or "greater than or equal," and the specific depth test result is that the depth value of the incoming fragment does not equal the depth value in the depth buffer, then the out of order technique is not applied. In addition, if blending is enabled for a fragment, then the out of order technique is not applied. In the situation that the z-function is the "less than" z-function or the "greater than" z-function, the out-of-order technique is not applied, unless the depth value of the incoming fragment equals the depth value stored in the depth buffer. In that situation, the out-of-order technique is applied. More specifically, the earliest fragment in logical order passes the z-test in this situation and is not dropped.

FIG. 5 illustrates details of the out of order export block 324 and the scoreboard 326, as well as example operations for performing out of order exports from the pixel shader stage 316. These operations allow the pixel shader stage 316 to export shaded fragments out of API order. FIG. 5 shows a sequence of fragments exported from the pixel shader stage 316 provided to the out of order export block 324, which processes those fragments in the order received from the pixel shader stage 316 (which may be out of order with respect to API order) to output processed fragments to the output merger stage 318 (although it should be recognized that variations in the graphics processing pipeline are possible and that therefore it is possible for the out of order export block 324 to export processed fragments to a block other than the output merger stage 318).

The out of order export block 324 includes a scoreboard 326 that stores fragment timestamps 504 for fragments that are being or have been processed by the pixel shader stage 316. Referring momentarily to FIG. 3, the depth block 315, which includes the out of order export block 324, both provides input to, and receives output from, the pixel shader stage 316, and thus is capable of processing fragments that are input to the pixel shader stage 316 as well as fragments at the output of the pixel shader stage 316.

Referring back to FIG. 5, the out of order export block 324 updates the scoreboard 326 based on fragments received from an upstream stage of the graphics processing pipeline 134 (e.g., the rasterizer stage 314). Updating the scoreboard 326 involves updating fragment timestamps 504 based on the received fragments. More specifically, for each screen position, the out of order export block 324 updates the fragment timestamp 504 for that screen position to reflect the newest fragment, in API order, that is being processed or that was previously processed by the pixel shader stage 316. Thus, each fragment timestamp 504 includes a screen position and the timestamp of the newest encountered fragment for that screen position. In some examples, the timestamp is a numerical identifier of relative API order, with a lower number indicating an older fragment and a higher number indicating a newer fragment, in API order.

The depth block 315 transmits the fragments to the pixel shader stage 316 for processing. The pixel shader stage 316 processes the fragments (e.g., by executing a pixel shader program) and, when such processing is complete, is ready to export the fragments. When the pixel shader stage 316 is ready to export a fragment, the out of order export block 324 determines whether the scoreboard 326 indicates that the ready-to-export fragment is the newest fragment encountered by the pixel shader stage 316. If the scoreboard 326 indicates that the ready-to-export fragment is the newest fragment encountered by the pixel shader stage 316, then the out of order export block 324 allows that fragment to be exported for processing by the remainder of the graphics processing pipeline (e.g., by the output merger stage 318), even if that fragment is to be output before an older fragment has finished processing in the pixel shader stage 316. If the scoreboard 326 indicates that the ready-to-export fragment is not the newest fragment encountered by the pixel shader stage 316, then the out of export block 324 discards that fragment.

FIG. 5 illustrates the above operations applied to several example fragments received by the out of order export block 324 from the pixel shader stage 316. Several example fragments 502 from the pixel shader stage 316 are illustrated. The order in which those fragments are determined to be ready for export by the pixel shader stage 316 is from top to bottom in FIG. 5. That is, the top-most fragment 502(1) is the oldest, out of the fragments 502 illustrated, and the bottom-most fragment 502(6) is the newest. This order is not API order but is the order in which the fragments become ready to be exported by the pixel shader stage 316 (API order is reflected for each fragment 502 as the number after text "order," with a higher number indicating a newer fragment).

Six fragments 502 are illustrated in FIG. 5. A first fragment 502(1), received first out of the fragments shown, has screen position 32, 16 and API order 160. A second fragment 502(2), received second out of the fragments shown, has screen position 15, 30 and API order 102. A third fragment 502(3), received third out of the fragments shown, has screen position 15, 30 and API order 100. A fourth fragment 502(4) has screen position 14, 1 and API order 75. A fifth fragment 502(5) has screen position 32, 16 and API order 140. A sixth fragment 502(6) has screen position 32, 16 and API order 122.

The scoreboard column illustrates the state of the scoreboard 326 immediately prior to processing a fragment 502 ready to be exported from the pixel shader. A first fragment timestamp 504(1) indicates that the newest encountered fragment for screen position 15, 30 has API order of 102. A second fragment timestamp 504(2) indicates that the newest encountered fragment for screen position 14, 1 has API order 75. A third fragment timestamp 504(3) indicates that the newest encountered fragment for screen position 32, 16 has API order 160.

Prior to receiving the first fragment 502(1), entries for screen positions {15, 30}, {14, 1}, and {32, 16} include invalid data (assuming no fragments have been received for those screen positions). Upon receiving the first fragment 502(1), the out-of-order export block checks the scoreboard for an entry for the screen position matching that of the first fragment 502(1). Finding an invalid value for that screen position, the out of order export block 324 allows the first fragment 502(1) to be exported and updates the scoreboard entry for screen position {32, 16} to have the API order timestamp of the first fragment 502(1), which is 160.

Upon receiving the second fragment 502(2), which has screen position {15, 30}, the out of order export block 324 checks the scoreboard 326 and determines that an invalid entry exists for that screen position. In response, the out of order export block 324 allows the second fragment 502(2) to be exported and updates the entry of the scoreboard 326 for screen position {15, 30} to store the API order value of the second fragment 502(2), which is 102.

Upon receiving the third fragment 502(3), which has screen position {15, 30}, the out of order export block 324 checks the scoreboard and determines that the entry for screen position {15, 30} indicates that the third fragment is not the most recently encountered fragment 502 in API order, as the third fragment 502(3) has an older API order value (100) than the currently stored API order value (102) for screen position {15, 30}. In response to determining that the third fragment 502(3) is not the most recently encountered fragment 502, the out of order export block 324 culls the third fragment 502(3) and does not update the scoreboard 326.

Upon receiving the fourth fragment 502(4), which has screen position {14, 1}, the out of order export block 324 checks the scoreboard 326 and determines that an invalid entry exists for that screen position. In response, the out of order export block 324 allows the fourth fragment 502(4) to be exported and updates the entry of the scoreboard 326 for screen position {14, 1} to store the API order value of the fourth fragment 502(4), which is 75.

Upon receiving the fifth fragment 502(5), which has screen position {32, 16}, the out of order export block 324 checks the scoreboard 326 and determines that the fifth fragment 502(5), which has API order value 140, is not the most recently encountered fragment 502 for that screen position. In response, the out of order export block 324 culls that fragment and does not update the scoreboard 326.

Upon receiving the sixth fragment 502(6), which has screen position {32, 16}, the out of order export block 324 checks the scoreboard 326 and determines that the sixth fragment 502(6), which has API order value 122, is not the most recently encountered fragment 502 for that screen position. In response, the out of order export block 324 culls that fragment and does not update the scoreboard 326.

After all fragments for a particular screen position have been exported, the scoreboard 326 deallocates the entry for that screen position from the scoreboard 326, in order to conserve memory for use by other screen positions. In one example implementation, in the situation that a fragment is seen for which an entry in the scoreboard 326 needs to be allocated, but no more entries are available, no new fragments are allowed to enter the pixel shader stage 314 until an entry is freed in the scoreboard 326. In an alternative, instead of preventing fragments from entering the pixel shader stage 314, new fragments are allowed to enter and be processed by the pixel shader stage 314 but are not allowed to be exported until an entry is freed in the scoreboard 326.

Figure 6:
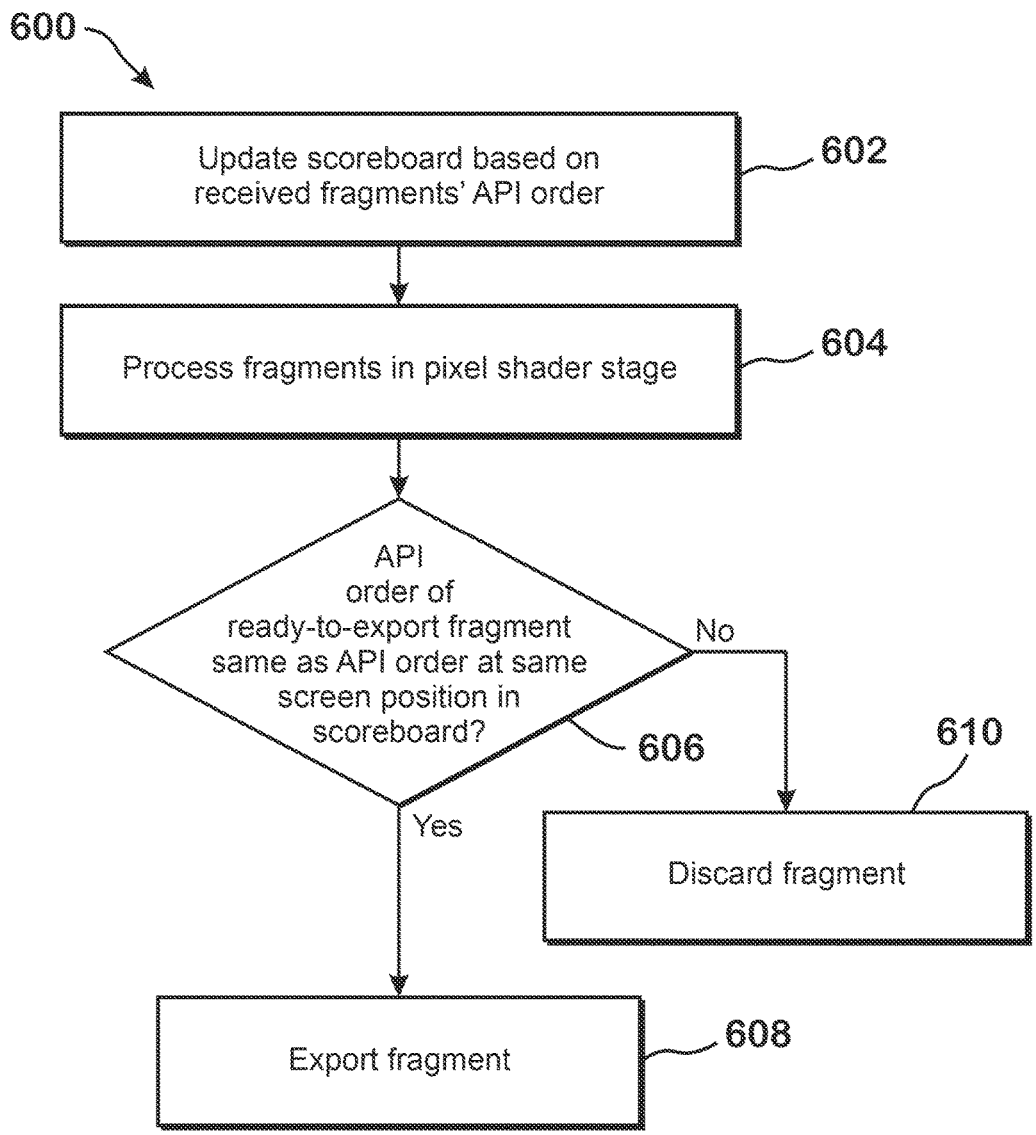
FIG. 6 is a flow diagram of a method for exporting fragments from a pixel shader stage of a graphics processing pipeline out of order, according to an example.

FIG. 6 is a flow diagram of a method 600 for exporting fragments from a pixel shader stage of a graphics processing pipeline out of order, according to an example. Although described with respect to the system shown and described with respect to FIGS. 1-5, it should be understood that any system configured to perform the method, in any technically feasible order, falls within the scope of the present disclosure.

The method 600 begins at step 602, where the out of order export block 324 receives fragments and updates the scoreboard 326 based on the received fragments. As described above, updating the scoreboard 326 includes updating the stored API order value for the screen position of received fragments to indicate the API order of the newest fragment encountered.

At step 604, the pixel shader stage 316 processes the fragments. This processing includes executing a pixel shader program on the fragments. At step 606, the out of order export block 324 checks whether the API order of the ready-to-export fragment is the same as the API order at the same screen position in the scoreboard 326. If the API order is not the same, then the API order indicates that the fragment is not the newest fragment and thus at step 610, the out of order export block 324 discards the fragment. If at step 606, the API order is the same, then the API order indicates that the fragment is the newest fragment and thus at step 610, the out of order export block 324 allows the fragment to be exported to the remainder of the graphics processing pipeline 134.

A method for exporting fragments from a pixel shader stage of a graphics processing pipeline is provided. The method includes maintaining a scoreboard that indicates newest fragments encountered in the pixel shader stage, with respect to application programming interface order ("API order"). The method also includes processing a fragment in the pixel shader to generate a shaded fragment, the shaded fragment having a screen position. The method further includes determining whether the shaded fragment is the newest fragment for the screen position encountered by the pixel shader stage, based on the scoreboard. The method also includes if the shaded fragment is the newest fragment for the screen position encountered by the pixel shader stage, then exporting the shaded fragment for processing in a subsequent stage of the graphics processing pipeline. The method further includes if the shaded fragment is not the newest fragment for the screen position encountered by the pixel shader stage, then discarding the fragment.

An accelerated processing device ("APD") including a graphics processing pipeline is also provided. The APD includes a pixel shader stage configured to process a fragment to generate a shaded fragment having a screen position and an out of order export block. The out of order export block is configured to maintain a scoreboard that indicates newest fragments encountered in the pixel shader stage, with respect to application programming interface order ("API order"). The out of order export block is also configured to determine whether the shaded fragment is the newest fragment for the screen position encountered by the pixel shader stage, based on the scoreboard. The out of order export block is further configured to if the shaded fragment is the newest fragment for the screen position encountered by the pixel shader stage, then export the shaded fragment for processing in a subsequent stage of the graphics processing pipeline. The out of order export block is also configured to if the shaded fragment is not the newest fragment for the screen position encountered by the pixel shader stage, then discard the fragment.

A computing device is also provided. The computing device includes an accelerated processing device ("APD") and a central processing unit configured to generate requests for processing graphics objects in application programming interface order ("API order") and to transmit the requests to the APD for processing. The APD includes a graphics processing pipeline that includes a pixel shader stage that is configured to process a fragment to generate a shaded fragment having a screen position, the fragment being based on the graphics objects. The APD also includes an out of order export block that is configured to maintain a scoreboard that indicates newest fragments encountered in the pixel shader stage, with respect to application programming interface order ("API order"), determine whether the shaded fragment is the newest fragment for the screen position encountered by the pixel shader stage, based on the scoreboard, if the shaded fragment is the newest fragment for the screen position encountered by the pixel shader stage, then export the shaded fragment for processing in a subsequent stage of the graphics processing pipeline, and if the shaded fragment is not the newest fragment for the screen position encountered by the pixel shader stage, then discard the fragment.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for exporting fragments from a pixel shader stage of a graphics processing pipeline, the method comprising:
    maintaining a scoreboard that indicates a newest fragment encountered in the pixel shader stage, for each of a plurality of screen positions, with respect to application programming interface order ("API order");
    processing a fragment in the pixel shader stage to generate a shaded fragment, the shaded fragment having a screen position corresponding to one of the plurality of screen positions;
    determining whether the shaded fragment is the newest fragment, with respect to the API order, encountered by the pixel shader stage for the screen position, based on the scoreboard;
    if the shaded fragment is the newest fragment in the API order, for the screen position of the shaded fragment, encountered by the pixel shader stage, then exporting the shaded fragment for processing in a subsequent stage of the graphics processing pipeline; and
    if the shaded fragment is not the newest fragment in the API order, for the screen position of the shaded fragment, encountered by the pixel shader stage, then discarding the fragment.

2. The method of claim 1, further comprising:
    performing z-culling for the fragment prior to processing the fragment in the pixel shader stage.

3. The method of claim 1, further comprising:
    performing z-culling for the fragment after processing the fragment in the pixel shader stage and before determining whether the shaded fragment is the newest fragment for the screen position encountered by the pixel shader stage, based on the scoreboard.

4. The method of claim 3, wherein:
    the z-culling is performed with one or more of:
        writes to a depth buffer disabled;
        an "equals" z-function; or
        a "less than or equals" z-function or a "greater than or equals" z-function, and a z-test result in which a depth value of the fragment is equal to a depth value stored for the screen position of the fragment in the depth buffer.

5. The method of claim 1, wherein:
    determining whether the shaded fragment is the newest fragment for the screen position encountered by the pixel shader stage, based on the scoreboard, comprises comparing the API order of the shaded fragment to an API order stored for the screen position of the fragment in the scoreboard.

6. The method of claim 1, wherein maintaining the scoreboard comprises:
    receiving the fragment from a pipeline stage that is upstream of the pixel shader stage; and
    updating, in the scoreboard, the API order for the screen position of the fragment, to reflect the newer of the API order stored in the scoreboard for the screen position of the fragment and the API order of the shaded fragment.

7. The method of claim 6, wherein receiving the fragment from a pipeline stage that is upstream of the pixel shader stage comprises:
    receiving the fragment from a rasterizer stage of the pixel shader stage.

8. The method of claim 1, wherein exporting the shaded fragment for processing in the subsequent stage of the graphics processing pipeline comprises exporting the shaded fragment for processing in an output merger stage of the graphics processing pipeline.

9. The method of claim 1, further comprising:
    prior to discarding the fragment, determining that blending is disabled for the fragment.

10. An accelerated processing device ("APD") including a graphics processing pipeline, the accelerated processing device comprising:
    a pixel shader stage configured to process a fragment to generate a shaded fragment having a screen position; and
    an out of order export block configured to:
        maintain a scoreboard that indicates newest fragments encountered in the pixel shader stage for each of a plurality of screen positions, with respect to application programming interface order ("API order");
        determine whether the shaded fragment is the fragment that is the newest, in API order, encountered by the pixel shader stage for the screen position, based on the scoreboard;
        if the shaded fragment is the newest fragment in API order, for the screen position of the shaded fragment, encountered by the pixel shader stage, then export the shaded fragment for processing in a subsequent stage of the graphics processing pipeline; and if the shaded fragment is not the newest fragment in API order, for the screen position of the shaded fragment, encountered by the pixel shader stage, then discard the fragment.

11. The APD of claim 10, further comprising:
a depth block configured to perform z-culling for the fragment prior to processing the fragment in the pixel shader stage.

12. The APD of claim 10, further comprising:
a depth block configured to perform z-culling for the fragment after processing the fragment in the pixel shader stage and before determining whether the shaded fragment is the newest fragment for the screen position encountered by the pixel shader stage, based on the scoreboard.

13. The APD of claim 12, wherein:
the depth block is configured to perform the z-culling with one or more of:
writes to a depth buffer disabled;
an "equals" z-function; or
a "less than or equals" z-function or a "greater than or equals" z-function, and a z-test result in which a depth value of the fragment is equal to a depth value stored for the screen position of the fragment in the depth buffer.

14. The APD of claim 10, wherein:
the out of order export block is configured to determine whether the shaded fragment is the newest fragment for the screen position encountered by the pixel shader stage, based on the scoreboard, by comparing the API order of the shaded fragment to an API order stored for the screen position of the fragment in the scoreboard.

15. The APD of claim 10, wherein the out of order export block is configured to maintain the scoreboard by:
receiving the fragment from a pipeline stage that is upstream of the pixel shader stage; and
updating, in the scoreboard, the API order for the screen position of the fragment, to reflect the newer of the API order stored in the scoreboard for the screen position of the fragment and the API order of the shaded fragment.

16. The APD of claim 15, wherein:
the pipeline stage that is upstream of the pixel shader stage comprises a rasterizer stage.

17. The APD of claim 10, wherein the out of order export block is configured to export the shaded fragment for processing in the subsequent stage of the graphics processing pipeline by exporting the shaded fragment for processing in an output merger stage of the graphics processing pipeline.

18. The APD of claim 10, wherein the out of order export block is further configured to:
prior to discarding the fragment, determine that blending is disabled for the fragment.

19. A computing device, comprising:
an accelerated processing device ("APD"); and
a central processing unit configured to generate requests for processing graphics objects in application programming interface order ("API order") and to transmit the requests to the APD for processing,
wherein the APD includes a graphics processing pipeline that includes:
a pixel shader stage configured to process a fragment to generate a shaded fragment having a screen position, the fragment being based on the graphics objects; and
an out of order export block configured to:
maintain a scoreboard that indicates newest fragments encountered in the pixel shader stage for each of a plurality of screen positions, with respect to the API order;
determine whether the shaded fragment is the fragment that is the newest, with respect to the API order, encountered by the pixel shader stage for the screen position, based on the scoreboard;
if the shaded fragment is the newest fragment in API order, for the screen position of the shaded fragment, encountered by the pixel shader stage, then export the shaded fragment for processing in a subsequent stage of the graphics processing pipeline; and
if the shaded fragment is not the newest fragment in API order, for the screen position of the shaded fragment, encountered by the pixel shader stage, then discard the fragment.

20. The computing device of claim 19, further comprising:
a depth block configured to perform z-culling for the fragment prior to determining whether the shaded fragment is the newest fragment for the screen position encountered by the pixel shader stage, based on the scoreboard.

* * * * *